April 11, 1961 T. J. RHODES 2,978,747
RUBBER SHAPING AND VULCANIZING APPARATUS
Original Filed Aug. 31, 1954 5 Sheets-Sheet 1

INVENTOR.
THOMAS J. RHODES
BY
Charles Q. Blank
ATTORNEY

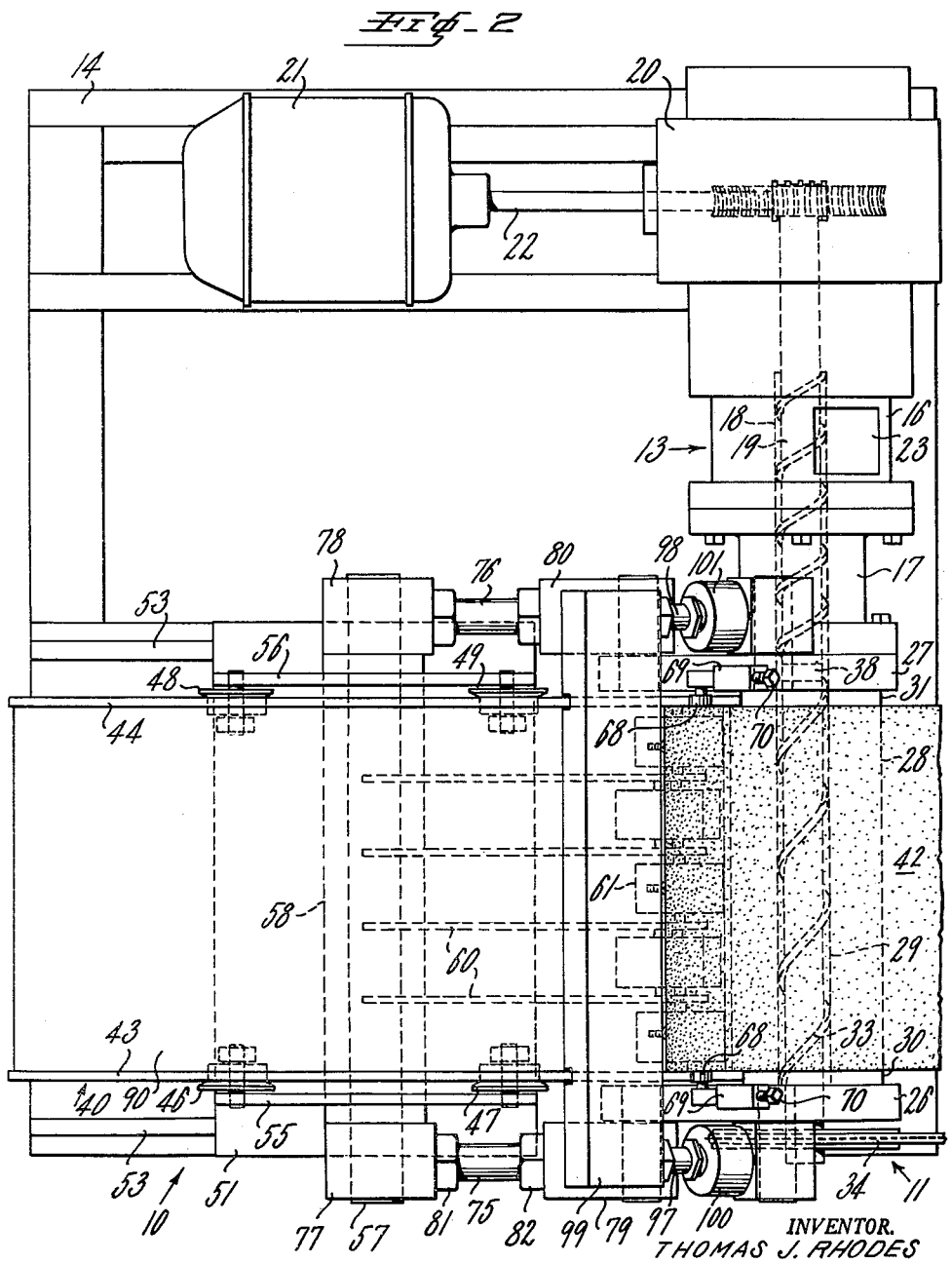

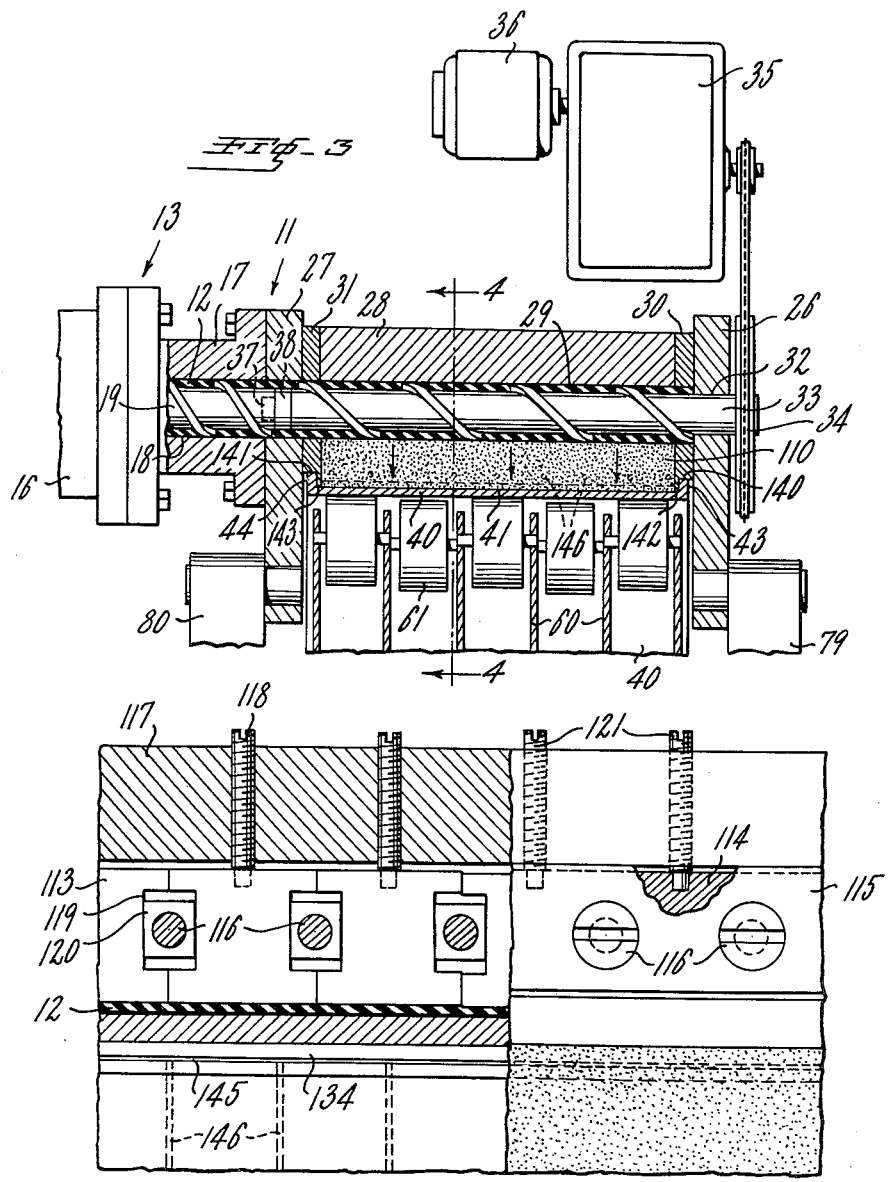

April 11, 1961 T. J. RHODES 2,978,747
RUBBER SHAPING AND VULCANIZING APPARATUS
Original Filed Aug. 31, 1954 5 Sheets-Sheet 4
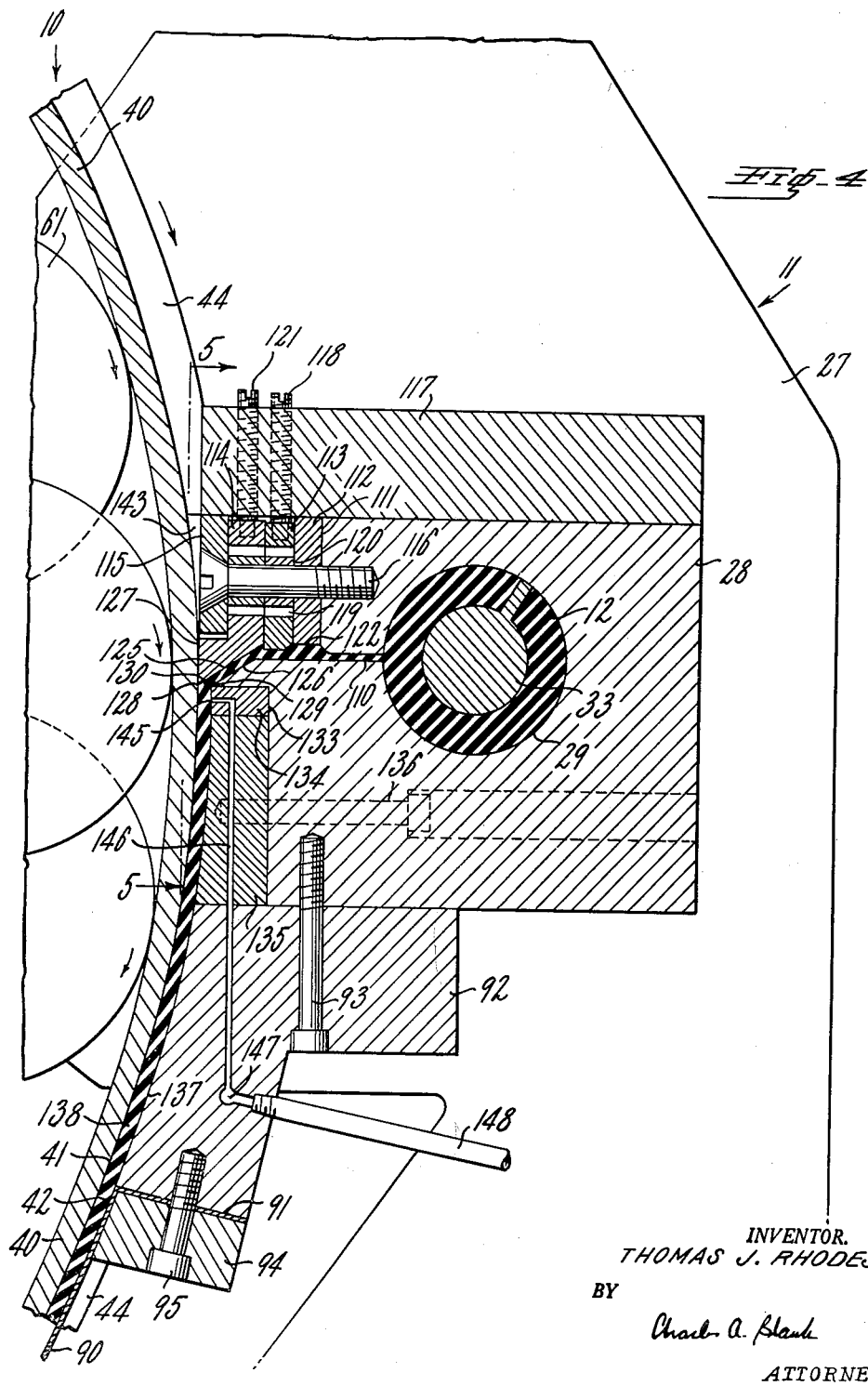
INVENTOR.
THOMAS J. RHODES
BY
Charles A. Blank
ATTORNEY

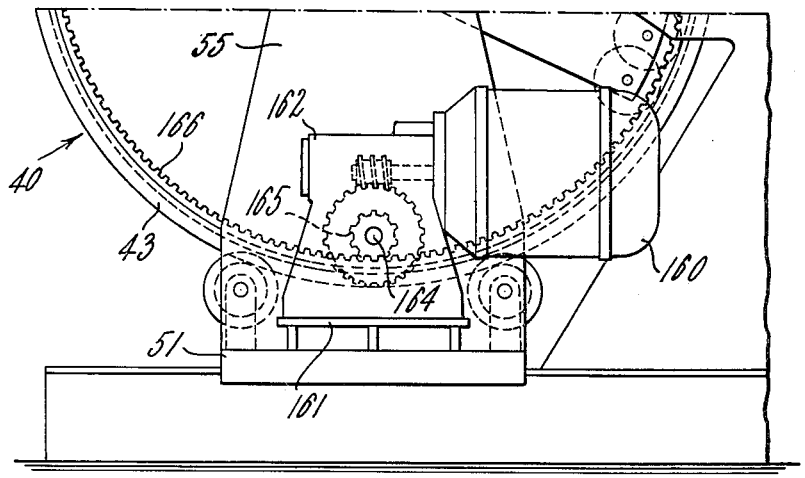
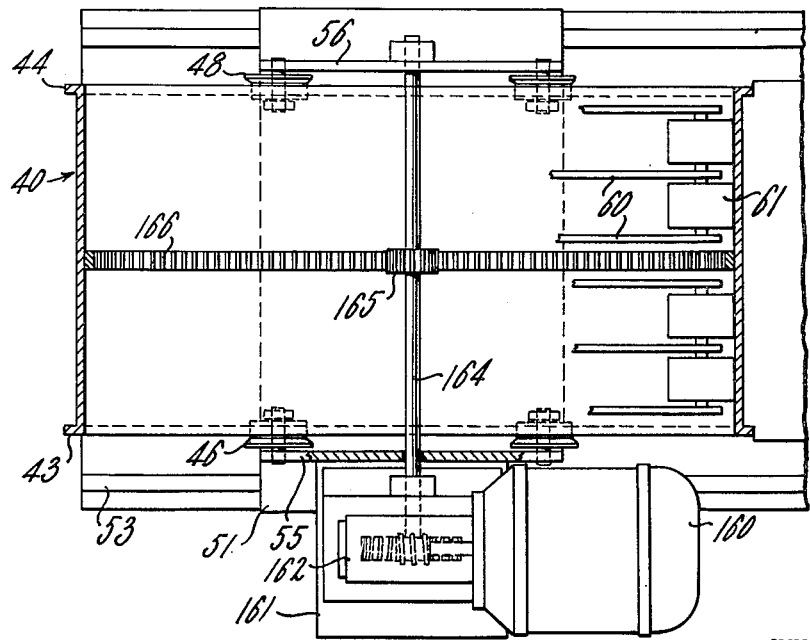

United States Patent Office 2,978,747
Patented Apr. 11, 1961

2,978,747

RUBBER SHAPING AND VULCANIZING APPARATUS

Thomas J. Rhodes, Smoke Rise, N.J., assignor to United States Rubber Company, New York, N.Y., a corporation of New Jersey Original application Aug. 31, 1954, Ser. No. 453,321, now Patent No. 2,842,796, dated July 15, 1958. Divided and this application Apr. 18, 1958, Ser. No. 729,302

3 Claims. (Cl. 18—12)

This invention relates to an apparatus for continuously shaping and vulcanizing rubber, and more particularly it relates to an extrusion apparatus for continuously producing a running length of vulcanized rubber sheet.

This application is a division of my copending application Serial No. 453,321, filed August 31, 1954, now Patent 2,842,796 of July 15, 1958, and entitled "Rubber Shaping and Vulcanizing Apparatus."

The principal object of the invention is to provide a simpler and more efficient apparatus for preparing a long length of a relatively wide rubber sheet or blanket.

The manner in which the invention accomplishes the foregoing and additional objects and advantages will be made manifest in the following detailed description, which is intended to be read with reference to the accompanying drawings, wherein:

Fig. 2 is a plan view of the apparatus of Fig. 1;

Fig. 3 is a fragmentary plan view with parts broken away and parts shown in section substantially along the lines 3—3 of Fig. 1;

Fig. 4 is an enlarged fragmentary sectional elevational view on a larger scale taken along the line 4—4 of Fig. 3;

Fig. 5 is a fragmentary end elevational view, with parts broken away, taken substantially along the lines 5—5 of Fig. 4; and, Figs. 6 and 7 are fragmentary front elevational and plan views, respectively, of a modification of the invention.

Figure 1:
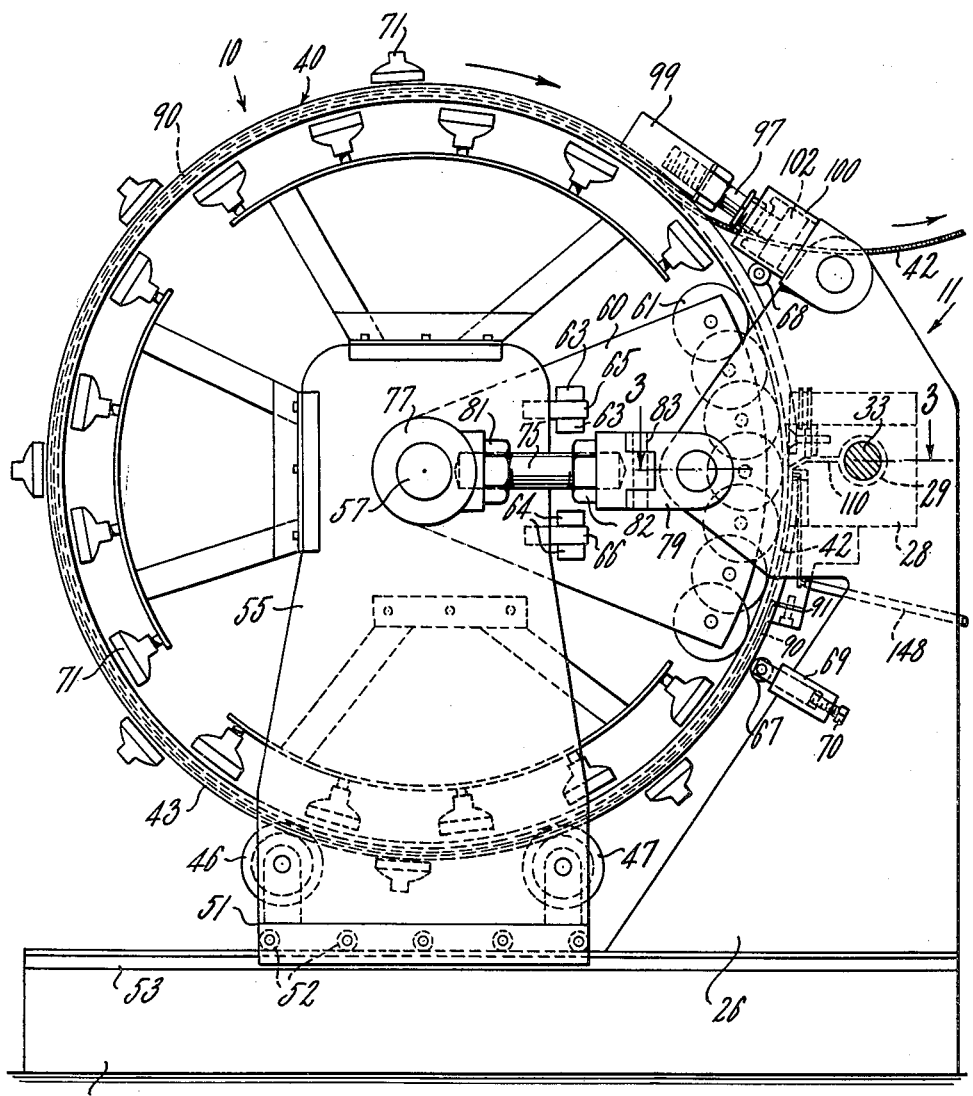
Fig. 1 is a side elevational view, with certain portions broken away, of an apparatus constructed in accordance with the invention.

Referring to the drawings, and in particular to Figs. 1 and 2, the apparatus shown therein comprises a rotary vulcanizing assembly 10 in combination with an extrusion head assembly 11, to which vulcanizable rubber stock 12 (Figs. 3, 4 and 5) is fed continuously under pressure by a stuffer assembly 13 (Figs. 2 and 3), the entire arrangement being supported on a suitable base framework 14 (Figs. 1 and 2). The extrusion head assembly 11 and the stuffer assembly 13 may be referred to collectively as an extrusion device.

The stuffer assembly is made up of a stuffer barrel constructed in two axially contiguous sections 16 and 17 (Figs. 2 and 3) for ease of assembly, which may be provided with conventional internal heating means (not shown) for heating the rubber stock being extruded to working temperature. An axial bore 18 within the stuffer barrel contains a rotatably mounted stuffer screw 19 which extends at its rear or feed end into a gear box 20 (Fig. 2) by means of which the screw is rotated at a desired rate of speed under the influence of a variable speed driving motor 21 mounted on the framework of the machine and operatively connected to the gear box by a drive shaft 22. A feed opening 23 in the upper portion of the rear or entrance section 16 of the stuffer barrel communicates with the stuffer bore 18 and screw 19 for the purpose of charging the raw rubber stock to the stuffer assembly.

The extrusion head assembly is supported between two spaced vertical end plates 26, 27 extending upwardly from the base frame 14, and comprises a horizontally extending main extrusion head block 28 containing an internal bore 29 which is axially aligned with and forms a continuation of the stuffer bore 18. The front or delivery end of the forward stuffer barrel section 17 is secured to the outer side of one of the vertical end plates (27). An additional vertical spacer plate 30, 31 (Fig. 3) is interposed between each end of the main extrusion head block 28 and the side plates 26, 27, and such spacer plates are also bored so that a continuous extrusion passage is provided axially of the extrusion head. An axially aligned reduced bore 32 in the forward end plate 26 provides a bearing surface through which an extrusion head screw 33 extends within the extrusion head bore. The extrusion head screw has the same root diameter or shaft diameter as the stuffer screw. An externally extending end of the extrusion head screw is provided with a suitable driving means 34 connected to a variable speed transmission 35 which is powered by a motor 36. The inner or feed end of the extrusion head screw has a portion 37 of reduced diameter which fits rotatably into a corresponding recess in the forward or delivery end of the stuffer screw 19, and an interposed ring 38, made of anti-friction material and having the same outside diameter as the screw shafts, abuts the opposed ends of each of the screws to facilitate free relative rotation of the two screws with respect to each other. The flight or thread of the stuffer screw is of lesser pitch than the flight of the extrusion head screw, and each screw is driven at a carefully controlled different speed, as will be described in more detail below in conjunction with the exposition of the manner of operation of the device.

Before completing the detailed description of the extrusion head assembly, the rotary vulcanizing assembly 10 will first be described. Such vulcanizing assembly comprises a "floating" cylindrical rigid band or drum 40, that is, a drum which is not supported at its center. The drum has the form of an annular band, the outer surface 41 of which is perfectly smooth if a plain surface is desired on the final vulcanized rubber sheet 42, or, if an embossed grain or design is desired on the vulcanized sheet, the surface of the drum is appropriately engraved or otherwise provided with a texture or relief pattern. At the lateral edges of the drum raised radially outwardly extending integral rims or flanges 43 (Figs. 1, 2, 3), 44 (Figs. 2, 3, 4) are provided which serve to define the edges of the sheet and cooperate with parts to be described subsequently to form a positively enclosed shaping and vulcanizing chamber of proper shape for the rubber sheet. The depth of the rims with respect to the surface of the drum exceeds the thickness of the thickest sheet that it is desired to form.

Underneath rotary support is provided for the vulcanizing drum by two pairs of flanged wheels 46—47 (Figs. 1, 2), 48—49 (Fig. 2), rotatably mounted upon an undercarriage 51, which is capable of moving horizontally toward and away from the extrusion head on suitable underneath carriage wheels 52 (Fig. 1), riding on parallel rails 53 on the base of the machine.

Vertical supporting pillars 55 (Figs. 1, 2), 56 (Fig. 2) extend upwardly from the carriage 51 at each side of the drum, and a horizontal axial supporting rod 57 extends from one of these pillars to the other axially through the center of the drum, but such axial supporting rod is of course free of attachment to the drum, since the latter is a "floating" drum, as previously explained. To aid in maintaining the drum on center against the force of the extruding rubber, a central sleeve 58 (Fig. 2) is coaxially mounted on the axial supporting rod, and a plurality of spaced segmental plates 60 positioned along the axis and fastened to such sleeve radiate outwardly toward the extrusion head assembly into proximity with the inner surface of the drum in this area. Mounted between adjacent pairs of segmental plates toward their outer ends are a plurality of rows of back-up rollers 61 arranged in staggered relation and bearing firmly on their outer peripheral faces against the inner peripheral face of the drum, thereby providing multiple closely spaced points of resistance to the pressure of the extrudate. The outer peripheral faces of the back-up rollers are all disposed in the plane of an arc having as its center the point about which it is desired to have the drum rotate. The assembly of segmental plates 60 and axial sleeve 58 is not intended in operation to rotate about the central axial supporting rod 57, but the purpose of thus mounting these parts on a central axial supporting rod is simply one of convenience in assembly. To prevent the assembly of segmental plates from rotating, the outermost plate is provided with pairs of spaced fixed laterally projecting lugs 63—63, 64—64 which bear against interposed fixed lugs 65, 66 projecting from the side pillar 55 when the parts are assembled in operable relation.

Further maintenance of the floating drum in the desired position is effected with the aid of upper and lower external rollers 67, 68 which bear against the outer peripheral surface of the drum flanges. Each of such rollers is adjustably mounted on the extrusion head supports by means of a fixed bracket 69 and an adjusting screw arrangement 70. This arrangement is duplicated at each side of the assembly.

The heat required for vulcanization of the rubber stock is provided by a series of spaced radiant heaters 71 positioned in close proximity to the inner and outer peripheries of the drum.

The drum assembly is removably and adjustably connected to the extrusion head supports by means of horizontal tie rods 75, 76 extending radially of the drum and transversely of the extrusion head outside of each of the drum support pillars 55, 56. Each tie rod is threaded at one end into a mounting piece 77, 78 carried at each end of the central axial supporting rod 57, while at their opposite ends the tie rods are threaded into mounting pieces 79, 80 which are pivotally secured to forward portions of the extrusion head brackets 26, 27. Such pivotal mounting at each end of the tie rods facilitates assembly. Adjustment of the relative position of the drum assembly with respect to the extrusion head is effected by turning the tie rods in an appropriate direction (the entire drum assembly meanwhile being free to roll back and forth on the underneath rails 53) and the parts may be fixed firmly in a desired position by tightening nuts 81, 82 provided toward each end of the tie rods for this purpose. This arrangement is duplicated at each side of the assembly. Appropriate adjustment of the smaller outer guide rollers 67, 68 may also be made at the same time.

To enable rapid disassembly of the vulcanizing drum from the extrusion head, the mounting piece 79 connected to the extrusion head brackets is made in two detachable sections which are normally held together by a pin 83 (Fig. 1) passing therethrough. By removing the pin 83, the interfitting parts of the mounting bracket 79 may be separated. It will be understood that the corresponding mounting piece 80 at the opposite side of the machine is similarly separably constructed, and when each mounting piece is separated as described, the entire drum assembly may then be rolled backward away from the extrusion head on the underneath carriage wheels 52.

For the purpose of positively confining the rubber sheet 42 in contact with the surface 41 of the vulcanizing drum there is provided a comparatively flexible encircling band or shield 90 of such width as to fit snugly between the drum flanges 43, 44 in sliding engagement therewith. At one end the band is fixed firmly to the extrusion head assembly by securing a transversely bent end portion 91 (Fig. 4) of the band to the under surface of a downwardly extending bracket 92 that is secured to the lower surface of the extrusion head block 28 by means of a series of upwardly extending bolts 93. A retaining plate 94, secured to the lower end surface of the bracket 92 by a series of bolts 95 serves to maintain the end of the band firmly in place. After passing around the greater portion of the periphery of the drum the band is adjustably attached to the upper portion of the extrusion head brackets by two adjustable tie rods 97 (Fig. 1), 98 (Figs. 1, 2). One end of each of the tie rods is threaded into an end bar 99 secured to the upper end surface of the band, while at their other ends the tie rods extend slidably into hydraulic cylinders 100, 101 that are pivotally attached to the upper ends of the extrusion head supports 26, 27. Each hydraulic cylinder contains a piston 102 (Fig. 1) which may be urged in a desired direction within the cylinder by suitable application of hydraulic fluid under pressure by conventional means (not shown). In this way the force exerted by the band 90 against the rubber sheet 42 on the drum may be controlled at a desired level, or the band may be relaxed when desired. Additional adjustment in the position or tension in the band may be effected by turning the tie rods 97, 98, thereby either advancing or withdrawing these tie rods with respect to the end bar 99.

Considering now the internal construction of the extrusion head assembly, the extrusion head bore 29 has a longitudinal side opening 110 (Figs. 1 and 4) extending horizontally radially in the direction of the drum and providing an outward extrusion channel for the rubber stock 12. A longitudinal recess 111 (Fig. 4) in the upper forward portion of the extrusion head block 28 accommodates an assembly comprised of a removable inner vertical spacer piece 112 extending the length of the block, against the outer face of which a horizontally contiguous series of vertically adjustable gate pieces or stops 113 abut. The outer faces of the gate pieces are in turn abutted by another vertically adjustable horizontally extending die plate 114 which is recessed in the upper portion of its outer face to accommodate a retaining plate 115 by which all such pieces are maintained in place in the die recess 111 by a series of retaining screws 116 passing transversely into the front of the die block. A top cover plate 117 surmounting the die block has a series of adjusting screws 118 threaded therethrough and extending into the gate pieces 113 for effecting vertical adjustment thereof. A vertical slot 119 in each end of each gate piece slidably accommodates a square collar 120 through which the retaining screws 116 pass. The collar 120 has the same thickness as the gate piece 113 and serves to maintain the gate pieces in proper alignment while facilitating vertical adjusting movement. A similar arrangement of adjusting screws 121 permits the outer die piece 114 to be adjusted vertically.

The under surface 122 of the inner spacer piece 112 is offset upwardly with respect to the upper surface of the extrusion passage 110, thereby providing a definite enlargement of such passage, of the order of 50% greater than the cross-section of the extrusion passage in the section immediately adjacet to the extrusion bore. The gate pieces 113 may be so positioned as to provide a subsequent restriction of the extrusion way, or they may be withdrawn upwardly to such an extent that they offer no resistance to the outward flow of rubber stock. Different gate pieces may be differently positioned along the transverse extent of the extrusion passage if necessary to provide uniform flow of rubber.

Toward its forward end the extrusion passage proceeds on a slant in the direction that the vulcanizing drum is intended to rotate, that is, the extrusion way proceeds on a downward slant, as defined between the downwardly slanting under surface 125 of the front die plate 114, and a correspondingly downwardly extending parallel surface 126 of the die block.

The forward face 127 of the front die plate 114 is separated from the surface 41 of the vulcanizing drum by a very small clearance space, suitably of the order of, for example, some 0.005 inch. The downwardly slanting under surface 125 of this plate terminates at a point 128 adjacent to the drum surface. The lower slanting surface 126 of the extrusion passageway does not extend as far forwardly as the opposite slanting surface 125 of the front die plate, but terminates at a point 129 definitely spaced from the drum surface, to define an extrusion orifice 130 that represents a termination or exit of the transverse extrusionway 110 through the main die block from the extrusion bore. The thickness of the extruded rubber sheet 42 is determined by this spacing, and such spacing may be varied by moving the entire vulcanizing drum toward or away from the extrusion head assembly by the mechanism previously described. When it is desired to thus make a change or adjustment in the thickness of the sheet being extruded, the front die plate 114 is first removed and another such plate of appropriate thickness is substituted, to position the front die surface appropriately with respect to the drum surface. To substitute such die plate the entire drum assembly is first disconnected from the extrusion head and moved out of the way on the lower rails 53, to give the operator access to the retaining screws 116 and permit disassembly and reassembly of the various die plates. In connection with such adjustment the forward die plate 114 is also appropriately vertically positioned as necessary, with the aid of the adjusting screws 121.

Immediately below the forward end 129 of the downwardly slanting surface 126 of the die passage, that is, immediately below the extrusion orifice 130, the die block contains a recess 133 extending into its front face which accommodates a snugly fitting lubricating block 134 and spacer block 135, the later being held in place by a series of bolts 136 extending thereinto from the rear face of the main die block. The forward faces of the blocks 134, 135 in the recess 133, and of the downwardly extending bracket member 92 secured to the lower face of the die block, are curved to present a rigid, unyielding arcuate back-up or forming surface concentric with the curved surface of the drum, thereby defining, between the outer surface 41 of the drum and the forward surface 137 of the lower die parts, an annular confining passage or cavity 138. The inner surface of the flexible band 90 forms with the drum a continuation of the passage or cavity 138 extending around the major portion of the circumference of the drum.

To provide more positive side confinement between the extrusion orifice and the drum at the extrusion head, the forward edges of the spacer plates 30, 31 (Fig. 3), provide lateral recesses 140, 141, each of which forms a channel into which a side flange 43, 44 of the vulcanizing drum extends in a sliding fit at the area of extrusion. The inner side faces of the drum flanges are slidably contacted by forwardly extending thin plates 142 (Fig. 3), 143 (Figs. 3, 4) which aid in completing a seal against the side escape of rubber stock from the extrusion area. The forward edges of the side confining plates 142, 143 are curved in accordance with the curvature of the drum, to provide a proper fit. These side confining plates also serve to prevent the stock from being forced, under the high pressure of the point of extrusion, firmly against and adhering to the inner faces of the flanges. That is, the side plates provide for a slight spacing between the edges of the extruded rubber sheet and the inner side faces of the flanges in the area of the extrusion.

The lubricating block 134 is provided with an extremely fine longitudinal opening 145 slightly spaced from the extrusion orifice 130 in the direction of travel of the rubber. This lubricating orifice is supplied with a liquid lubricating substance that is not deleterious to rubber by means of a series of longitudinally spaced distributing channels 146 extending upwardly through the die block assembly. The lubricant distributing channels 146 are in turn supplied from a lower common header 147 located in the die head extension member 92, into which lubricant is introduced from an external supply line 148. A suitable metered positive pumping system (not shown) is connected to the external end of the supply line 148 for introducing lubricant to the surface of the rubber stock as it streams through the circumferential confining and vulcanizing passageway 138.

In operation, the vulcanizing drum assembly 10 is initially adjusted to a definite spacing with respect to the extrusion head assembly 11 by turning the threaded tie rods 75, 76, so as to provide between the curved surface 41 of the drum 40 and the correspondingly curved forward forming surface 137 of the lower forward parts of the die block assembly a gap 138 or channel of the same thickness as the desired rubber sheet 42. Initially the encircling band 90 is disposed in an essentially loose, untensioned condition by releasing any hydraulic pressure exerted on the pistons in the cylinders 100, 101 which connect the end bar 99 of the confining band to the extrusion head supports 26, 27.

Vulcanizable rubber stock 12 of conventional composition is fed into the feed or entrance opening 23 of the stuffer assembly 13, and the stuffer screw 19 is rotated by the variable speed driving motor 21 at such a rate as to deliver continuously and positively the required volume of rubber stock. Under the influence of the pressure exerted by the action of the stuffer screw, the raw rubber stock streams into and fills entirely the extrusion bore 29 of the extrusion head assembly. At the same time, the extrusion head screw 33 is rotated at a carefully controlled rate by means of the variable speed transmission 35. Exact control of the rate of rotation of the extrusion head screw is necessary because it has been found that uniform delivery of rubber stock throughout the length of the longitudinal extrusion passageway opening out of the forward side of the extrusion head bore 29 can be achieved only in this fashion. That is, for any given rate of delivery of rubber stock by the stuffer mechanism, and for any given pitch, root diameter and flight depth or thread depth of the extrusion head screw, it is found that there is a definite speed of rotation of the extrusion head screw that makes possible uniform flow throughout the extrusion orifice. At a slower speed of rotation of the extrusion head screw an undesirably greater quantity of stock will tend to come out of the longitudinal extrusion orifice at points located near the stuffer mechanism, at the expense of the quantity of stock passing through the extrusion orifice at points axially further removed from the stuffer mechanism. On the other hand if the extrusion head screw is rotated at a rate greater than the critical speed, more of the stock will pass out at the farther end of the extrusion outlet, and less at the end nearest the stuffer. A certain definite extrusion head screw speed intermediate of such undesirably low and high speeds represents the proper speed for uniform delivery of rubber at all points along the extrusion orifice, and, when this condition obtains it will, in general, not be necessary to resort to the use of the multiple adjustable gate pieces 113 to regulate the flow at different points across the extrusion passage. Such adjustable gates are provided simply as aids in establishing proper operation under extremes of operating conditions.

In general, the critical speed of the extrusion head screw will not be the same as the speed of the stuffer screw, except possibly for a rare coincidence of operating and design variables.

The thus-extruded rubber stock proceeds along the extrusion passageway 110 and through the downwardly slanting portion thereof defined between the surfaces 125, 126 of the forward extrusion head parts, to the exit orifice 130 from the die head. The forward upper die plate 114 has previously been adjusted so that the forward lower surface 127 thereof makes a rather loose running fit with the surface 41 of the vulcanizing drum, and so that the lower edge 128 thereof is in close proximity to the drum surface and spaced from the opposite edge 129 of the die block in such manner as to define a gap for the rubber stock corresponding to the thickness of the desired rubber sheet 42. If necessary the removable inner spacer block 112 is changed to one of different size to accommodate the parts properly, as previously described.

The rubber exuding from the orifice 130 is under considerable pressure (typically of the order of some 1000 to 1500 p.s.i.) and it moves downwardly into the initial portion of circumferential passage 138 defined between the curved surface of the drum and the correspondingly curved lower forward forming surface 137 of the die block parts. In such initial portion of the circumferential cavity or passage, as defined between the surface of the drum and the rigid forming surface 137 provided by the lower die parts, the rubber stock has imparted thereto the definite form of the desired rubber sheet 42. This form is retained as the rubber continues into the continuation of the cavity defined between the drum and the flexible band.

The rubber frictionally contacts the surface of the drum and causes the drum to rotate on its axis at a speed equal to the speed of advancement of the rubber, that is, there is no relative movement between the rubber and the surface of the drum, but the rubber and the drum move together as a unit. The "floating" drum is maintained on center by the back-up rollers rotatably supported against the inner surface of the drum, as explained previously, and these rollers serve to take the considerable thrust exerted against the drum by the rubber as it emerges from the extrusion orifice. This thrust is transmitted by the radial plates 60 which support the roller to the axial assembly 58, 57, and thence back through the tie rods 75, 76 connecting the drum assembly to the extrusion head supports 26, 27. In this way, the drum is prevented from being displaced away from the extruder by the force of the rubber.

The advancing rubber stock is prevented from frictionally engaging the contacting surface 137 of the extrusion head block and the inner surface of the encircling band 90 by introducing a thin film of lubricant at the lubricating orifice 145 located immediately below the extrusion orifice. Such film of lubricant covers the surface of the rubber adjacent the extrusion head block and encircling band and travels with the rubber as it advances with respect to the surface of the band around the periphery of the vulcanizing drum.

When the advancing rubber sheet 42 has passed entirely around the drum as far as the termination of the band at the end bar 99, appreciable tension is then applied to the band (the band having previously been in an essentially relaxed or untensioned state, for the purpose of facilitating the starting operation) by exerting appropriate hydraulic pressure within the upper portions of the tensioning cylinders 100, 101, thereby forcing the pistons therein downwardly and drawing the end bar 99 and the band, through the tie rods 97, 98 tightly against the rubber sheet on the drum. The rubber sheet is thus confined under pressure at each of its faces between the outer surfaces of the drum and the inner surface of the band, and at its edges the sheet is confined by the drum flanges 43, 44 which it contacts. The rubber is maintained under a pressure sufficient to prevent blowing during the cure, such pressure suitably being of the order of some 40 p.s.i. or more. With the machine illustrated, the exertion of a pull of the order of 30,000 pounds on the band provides the required pressure.

Another method of starting the machine is to dispose a suitable spacer sheet or blanket, of thickness corresponding to the desired rubber sheet, in the circumferential cavity defined between the drum and the band. As the extrusion operation is commenced the advancing rubber stock forces the spacer blanket progressively out of the cavity.

The radiant heaters 71 are so regulated as to maintain a temperature sufficiently elevated to cause the rubber sheet 42 to become substantially vulcanized as it passes around with the drum. The vulcanized sheet passes out at the termination of the band at the end bar 99 and the sheet may be wound up into a roll by a suitable wind-up device (not shown) as fast as it emerges from the apparatus under the influence of the extrusion pressure.

In the thus-far described embodiment of the invention, the rotary drum was driven by the force exerted by the extrudate, which is continually urged through the apparatus by the action of the stuffer. In a modification of the invention, as shown in Figs. 6 and 7, the rotary drum is provided with a driving means, in the form of a motor 160 mounted on an axial extension 161 projecting from the outer lower side of one of the drum supporting pillars 55. The motor mounting includes a gear housing 162 containing gearing by means of which an axially extending rotatably mounted axial shaft 164 is rotated at a desired rate. The shaft 164 extends rotatably through the lower portions of the drum side supporting pillars 55, 56 and carries near its center a small gear 165 that meshes with an internal circumferential ring gear 166 having internal teeth and fixed to the interior surface of the drum 40. The arrangement is therefore such that the drum 40 may be driven at a desired rate by the action of the motor 160, which is operated at an appropriatae, controlled speed. In this way, the speed of advancement of the extrudate, which moves as a unit with the drum, is controllable, thereby regulating more positively the time of dwell of the extrudate in the circumferential cavity. In the event of any tendency of the extrudate to move the drum faster than appropriate to the desired rate of advancement, the action of the motor will be such as to resist such increased speed. Conversely, in the event that the extrudate is not turning the drum rapidly enough under the influence of the extrusion pressure alone, the motor will tend to speed up the drum and the extrudate.

The finished vulcanized sheet is a dense vulcanizate of good quality, by reason of having been vulcanized while confined under pressure between the band and the drum surface. The lubricated surface of the rubber sheet, that is, the surface in contact with the band, is smooth and well formed by reason of such lubrication. The lubrication prevents disruption of either the surface of the sheet or the body of the sheet, such as would otherwise occur due to frictional engagement of the soft, sticky rubber stock with the surface of the band. If it were not for the lubrication feature, such disruption would be particularly likely to take place when the rubber is heated to vulcanizing temperature, at which time it is extremely soft and sticky, just prior to the actual commencement of the vulcanizing reaction. The result of such sticking would be a malformed, non-homogeneous vulcanizate, even assuming that it would be possible to exert enough pressure to force the rubber through the apparatus under such conditions. The opposite surface of the vulcanized sheet, that is, the surface adjacent to the drum, has the same surface character as the drum surface, whether smooth or embossed.

A particularly advantageous feature of the arrangement shown lies in the manner in which the circumferental forming and vulcanizing cavity for the rubber stock is defined over its initial sector, that is, over the sector of the cavity immediately adjacent to the extrusion orifice 130, with the aid of a rigid back-up or forming member represented by the forward surfaces 137 of the lower die block parts. Such rigid arcuate forming surface extending from the extrusion orifice in the direction of travel of the rubber serves to permit positive and accurate initial shaping of the rubber sheet. In this arrangement, the flexible band or shield forming the continuation of the confining cavity or passage begins at the termination of the rigid forming surface 137, that is, at the termination of the downward extension of the die block, which termination is spaced from the die orifice by a sufficient distance to permit the shape of the rubber sheet to become definitely established before the rubber passes into the subsequent arcuate portion of the confining cavity defined by the more flexible and more yielding encircling band.

Another desirable feature of the apparatus shown resides in the manner in which side confining members, such as thin plates 142, 143, are provided at each side of the extrusion exit 130 from the extrusion head for the purpose of insuring a more positive confinement and direction of the rubber stock against the surface of the drum. These members, because of the manner in which they extend over the inner surfaces of the drum flanges at the extrusion area, also perform the desirable function of preventing the stock, at and immediately following the moment of extrusion, from contacting the flanges, thereby avoiding any difficulty from undesirable shearing of the stock at the edges. It has been observed that this makes possible well formed edges, which do not adhere unduly to the drum flanges, and any tendency for the stock to ooze out around the edge of the band at the flanges is also avoided. Any slight space between the edges of the extruded stock and the inner faces of the drum flanges, as occasioned by the thickness of the side plates 142, 143, tends to become filled up with rubber stock by plastic flow of the stock as the rubber sheet passes away from the extrusion head, with the result that the edges of the sheet soon come into contact with the inner surfaces of the flanges, and the edges thus become well formed, without any difficulties such as might be encountered if there developed an excess of stock at the edges.

It will be noted that in the particular embodiment of the invention illustrated in the drawing two separate and independently controlled coaxially aligned screws of the same uniform diameter are employed, that is, each screw has the same root diameter or shaft diameter and the same thread depth or flight depth and hence the same external diameter. The first or stuffer screw has a certain pitch, while the second or extrusion head screw has a constant, greater pitch. Such arrangement has been found to be unusually effective in producing uniform delivery of the rubber stock all along the wide continuous or uninterrupted extrusion orifice, when the relative speeds of the screws are so adjusted that each delivers an equal volume of the stock, as described.

The machine described offers a very great cost saving over presently used machines for making cured rubber sheets, since the present machine is far simpler and requires an estimated capital investment of but one-tenth that of prior devices.

By use of the present machine, the usual calenders, which are extremely heavy and expensive machines, can be dispensed with. This is advantageous also from the standpoint of simplifying and improving gauge control, as well from the standpoint of permitting a wider range of thickness without resorting to multiple plying. No "crown" need be allowed as is generally required in a calender mill. It is considerably more feasible to adapt the present machine to the production of extremely wide sheets, whereas with calenders this would not be practical because of their mass and area requirements.

The present machine dispenses with the need for a continuous flexing and moving belt, passing repeatedly around various drums, such as is necessary in previously known devices. The great stresses that must be borne by such a moving belt, along with the continual severe flexing of the belt, have been an occasion of expense and difficulty, which the present invention eliminates.

With the present machine, there is no opportunity for distortion of the rubber sheet as a result of elastic memory, since the extrudate is cured while held against the drum, and stresses and strains created in the stock as a result of passing from the die are prevented from causing distortion.

The curing process is expedited in the present machine because the extruded stock proceeds at once to cure without loss of residual heat remaining from the extruding step.

It will be appreciated that the lubrication feature of the machine described renders the foregoing new results and advantages attainable, by making it possible for the extrudate to move with respect to the non-moving, relatively fixed encircling band, without frictional engagement therewith.

Having thus described my invention, what I claim and desire to protect by Letters Patent is:

1. An apparatus for forming a rubber sheet comprising a stuffer assembly for advancing under pressure a rubber stock in a heated, plastic condition, said stuffer assembly having an internal bore, a stuffer screw rotatably disposed within said stuffer bore and having a predetermined uniform thread diameter, means for rotating said stuffer screw to advance the stock to the delivery end of said stuffer assembly, an extrusion head assembly secured to the delivery end of said stuffer assembly, said extrusion head assembly containing a second bore coaxial with said first-mentioned stuffer bore and having substantially the same diameter as said stuffer bore and forming a continuation thereof, an extrusion head screw rotatably mounted within said extrusion head bore and having substantially the same uniform thread diameter as said stuffer screw and having a thread of greater pitch than said stuffer screw, a second driving means, connected to the extrusion head screw, for driving the extrusion head screw at a speed different from the speed of the stuffer screw and for advancing the stock along said extrusion head bore, and the said extrusion head assembly being provided with a longitudinal extrusion passage extending radially from the extrusion head bore to an outer surface of the extrusion head assembly.

2. An apparatus for extruding rubber comprising a stuffer assembly for delivering the rubber, said stuffer assembly having an internal bore, a stuffer screw rotatably disposed within said stuffer bore and having a thread of a given hand and having a predetermined uniform thread diameter and an extrusion head assembly in series with said stuffer for receiving the said rubber from the stuffer, said extrusion head containing a longitudinal axial bore one end of which constitutes an entrance end and having substantially the same diameter as said stuffer bore, said entrance end being in engagement with the delivery end of said stuffer, an extrusion head screw within said bore having a thread of said given hand and of greater pitch than said stuffer screw and having substantially the same uniform thread diameter as said stuffer screw and forming a continuation of said stuffer screw for advancing rubber stock received from the stuffer at said entrance end axially along the entire length of the bore, said head being provided with a longitudinal side outlet extending axially along one side of the bore for substantially the entire length of the bore from a point in proximity to the stuffer to points axially remote from the stuffer, a first driving means connected to the stuffer for actuating said stuffer screw to advance the stock to said extrusion head, and a second driving means, independent of the first driving means, connected to the extrusion head screw for rotating the same independently of the stuffer but in the same rotational direction as said stuffer screw for advancing the stock along said extrusion head bore, whereby the extrusion head screw may be driven at a definite speed such that essentially the same quantity of rubber issues from the side outlet at points located near the stuffer as issues from the outlet at points axially further removed from the stuffer, and a sheet of rubber that is substantially uniform in thickness across its entire width is thus produced.

3. An apparatus for forming a rubber sheet comprising a stuffer assembly for advancing under pressure a rubber stock in a heated, plastic condition, said stuffer assembly having an internal bore, a stuffer screw rotatably disposed within said stuffer bore, and having predetermined uniform root and thread diameters and thread of constant pitch, means for rotating said stuffer screw to advance the stock to the delivery end of said stuffer assembly, an extrusion head assembly secured to the delivery end of said stuffer assembly, said extrusion head assembly containing a second bore coaxial with said first-mentioned stuffer bore and having substantially the same diameter as said stuffer bore, an extrusion head screw rotatably mounted within said extrusion head bore and forming a continuation of said stuffer screw and having substantially the same uniform root and thread diameters as said stuffer screw and having a thread of greater pitch than said stuffer screw, a second driving means, connected to said extrusion head screw, for driving said extrusion head screw at a speed different from the speed of said stuffer screw and for advancing the stock along seaid extrusion head bore, and said extrusion head assembly being provided with a longitudinal extrusion passage extending radially from said extrusion head bore to an outer surface of said extrusion head assembly.

References Cited in the file of this patent

UNITED STATES PATENTS

| | | |
|---|---|---|
| 2,229,422 | Schade et al. | Jan. 21, 1941 |
| 2,431,274 | Osborne | Nov. 18, 1947 |
| 2,437,460 | De Francisci | Mar. 9, 1948 |
| 2,783,498 | Richardson | Mar. 5, 1957 |

FOREIGN PATENTS

| | | |
|---|---|---|
| 930,773 | France | Aug. 25, 1947 |
| 682,543 | Great Britain | Nov. 12, 1952 |